US012789479B2

(12) United States Patent
Tay et al.

(10) Patent No.: US 12,789,479 B2
(45) Date of Patent: Nov. 10, 2026

(54) COMPOSITE STRINGER PACKAGES AND SYSTEMS AND METHODS FOR CONSTRUCTING COMPOSITE STRINGER PACKAGES

(71) Applicant: The Boeing Company, Arlington, VA (US)

(72) Inventors: Kieran J. Tay, Newark, DE (US); Clay R. Parrish, Charleston, SC (US); Luis F. Velasquez, Ladson, SC (US); Richard E. Heath, Mount Pleasant, SC (US); Richard A. Prause, Charleston, SC (US)

(73) Assignee: The Boeing Company, Arlington, VA (US)

(*) Notice: Subject to any disclaimer, the term of this patent is extended or adjusted under 35 U.S.C. 154(b) by 52 days.

(21) Appl. No.: 18/973,622

(22) Filed: Dec. 9, 2024

(65) Prior Publication Data

US 2026/0091564 A1 Apr. 2, 2026

Related U.S. Application Data

(60) Provisional application No. 63/702,253, filed on Oct. 2, 2024.

(51) Int. Cl.

*B29C 70/44* (2006.01)
*B29C 70/54* (2006.01)
*B29L 31/30* (2006.01)

(52) U.S. Cl.

CPC ............ *B29C 70/44* (2013.01); *B29C 70/544* (2021.05); *B29L 2031/3082* (2013.01)

(58) Field of Classification Search

CPC ..... B29C 70/44; B29C 70/443; B29C 70/342; B29C 70/541; B29C 70/544; B29C 66/82;

(Continued)

(56) References Cited

U.S. PATENT DOCUMENTS 3,912,542 A * 10/1975 Hirano .............. B32B 17/10844 156/286
3,951,724 A * 4/1976 Johnson .............. B32B 37/1018 100/211

(Continued)

FOREIGN PATENT DOCUMENTS

| | | | |
|---|---|---|---|
| BR | 112014002045 | A2 | 2/2017 |
| FR | 2673571 | A1 | 9/1992 |
| WO | 2020152652 | A1 | 7/2020 |

OTHER PUBLICATIONS

European Patent Office, Extended European Search Report, App. No. 25205543.9 (Feb. 16, 2026).

(Continued)

*Primary Examiner* — Galen H Hauth
*Assistant Examiner* — Baileigh Kate Darnell
(74) *Attorney, Agent, or Firm* — Walters & Wasylyna LLC

(57) ABSTRACT

A system for constructing a composite stringer package includes a tray, a lid, a deformable membrane, and a vacuum rig. The tray includes a receptacle. The lid is configured for moving relative to the tray between an open state and a closed state. The deformable membrane is configured for positioning over the tray. The vacuum rig is coupled to the tray. With the lid in the closed state, the lid and the tray are sealed together to form a sealed chamber. With the lid in the closed state, the deformable membrane is positioned in the sealed chamber between the tray and the lid. With the lid in the closed state, the vacuum rig is configured for applying vacuum to the sealed chamber.

20 Claims, 14 Drawing Sheets

(58) Field of Classification Search
CPC ... B29C 66/828; B29C 66/8286; B29C 66/92; B29C 66/922; B29C 66/924; B29C 66/929; B32B 37/10; B32B 37/1018; B29L 2031/3082
See application file for complete search history.

(56) References Cited

U.S. PATENT DOCUMENTS

| | | | | |
|---|---|---|---|---|
| 5,281,388 | A | 1/1994 | Palmer et al. | |
| 8,192,574 | B1 * | 6/2012 | Boone | B29C 43/3642 425/389 |
| 10,569,484 | B2 | 2/2020 | Stewart et al. | |
| 11,014,315 | B2 | 5/2021 | Prause et al. | |
| 11,097,524 | B2 | 8/2021 | Halbritter | |
| 2019/0389176 | A1 | 12/2019 | Hebert et al. | |
| 2020/0114597 | A1 * | 4/2020 | Meure | B29B 11/16 |
| 2021/0260840 | A1 * | 8/2021 | Knutson | B29C 70/54 |
| 2021/0339516 | A1 | 11/2021 | Halbritter | |
| 2024/0140053 | A1 | 5/2024 | Spalding et al. | |

OTHER PUBLICATIONS

For translation of BR112014002045, see U.S. Pub. No. 2013/0036922 (Feb. 14, 2013).

* cited by examiner

COMPOSITE STRINGER PACKAGES AND SYSTEMS AND METHODS FOR CONSTRUCTING COMPOSITE STRINGER PACKAGES

PRIORITY

This application claims priority from U.S. Ser. No. 63/702,253 filed on Oct. 2, 2024, the entire contents of which are incorporated herein by reference.

FIELD

The present disclosure relates generally to composite manufacturing and, more particularly, to composite stringer packages and systems and methods for constructing, consolidating, and storing composite stringer packages for composite manufacturing.

BACKGROUND

Aircraft generally include an airframe, which may be regarded as an underlying skeleton to which skins are attached to form a smooth aerodynamic outer surface. Stringers of various shapes may be used for stiffening fuselage sections and wing skins on aircraft. Composite materials are often used in aircraft to decrease the weight of the aircraft. Modern aircraft may include both composite stringers and composite skins. Conventionally, composite stringers are attached to a composite skin using fasteners, curing the composite stringers to the composite skin, or a combination of the two. In some conventional processes, composite stringers are assembled on a cure tool or mandrel common to both the composite stringers and the composite skin.

Conventional composite stringer manufacturing requires separate processing and installation of the components that form the composite stringer. The process is time and labor intensive and is required for each stringer. For example, plies of composite material that form the stringer are installed on a cure tool or mandrel. The plies of composite material are then compacted on the cure tool or mandrel in an initial compaction step. Subsequently, a bladder and/or radius fillers are individually installed, as needed, on the cure tool to complete a stringer package. The stringer package is then consolidated or otherwise compacted on the cure tool or mandrel in a subsequent compaction step. A composite preform that forms the composite skin is then installed on the cure tool. The entire composite structure is then consolidated or compacted again in a final compaction step.

Each process associated with constructing the composite stringers adds to overall manufacturing time. Manufacturing time may limit the quantity of aircraft produced. Accordingly, those skilled in the art continue with research and development efforts in the field of composite manufacturing.

SUMMARY

Disclosed are examples of a system for constructing a composite stringer package, a composite stringer package constructing method, a composite manufacturing method, and a composite stringer package. The following is a non-exhaustive list of examples, which may or may not be claimed, of the subject matter according to the present disclosure.

In an example, the disclosed system includes a tray, a lid, a deformable membrane, and a vacuum rig. The tray includes a receptacle. The lid is configured for moving relative to the tray between an open state and a closed state. The deformable membrane is configured for positioning over the tray. The vacuum rig is coupled to the tray. With the lid in the closed state, the lid and the tray are sealed together to form a sealed chamber. With the lid in the closed state, the deformable membrane is positioned in the sealed chamber between the tray and the lid. With the lid in the closed state, the vacuum rig is configured for applying vacuum to the sealed chamber.

In an example, the disclosed constructing method includes steps of: (1) positioning a deformable membrane on a tray; (2) assembling a composite stringer package; (3) positioning a lid in a closed state relative to the tray to form a sealed chamber; (4) with the lid in the closed state, applying vacuum to the sealed chamber; and (5) compacting, by application of the vacuum, the composite stringer package between the deformable membrane and the lid.

In an example, the disclosed manufacturing method includes steps of: (1) arranging a composite charge and a bladder in a housing to form a composite stringer package; (2) consolidating the composite stringer package within the housing to form a consolidated composite stringer package; (3) transporting the consolidated composite stringer package in the housing; and (4) applying the consolidated composite stringer package to a mandrel.

In an example, the disclosed composite stringer package includes a composite charge that is positioned in a receptacle of a tray such that a deformable membrane that lines the tray is situated between the composite charge and the tray. The composite stringer package also includes a bladder that is positioned in the receptacle such that the composite charge is situated between the deformable membrane and the bladder. The composite charge and the bladder are enclosed within a sealed chamber that is formed by a lid and the tray. The composite charge and the bladder are compacted between the deformable membrane and the lid by applying vacuum in the sealed chamber through the deformable membrane.

Other examples of the system, the methods, and the composite stringer package will become apparent from the following detailed description, the accompanying drawings, and the appended claims.

DETAILED DESCRIPTION

Figure 1:
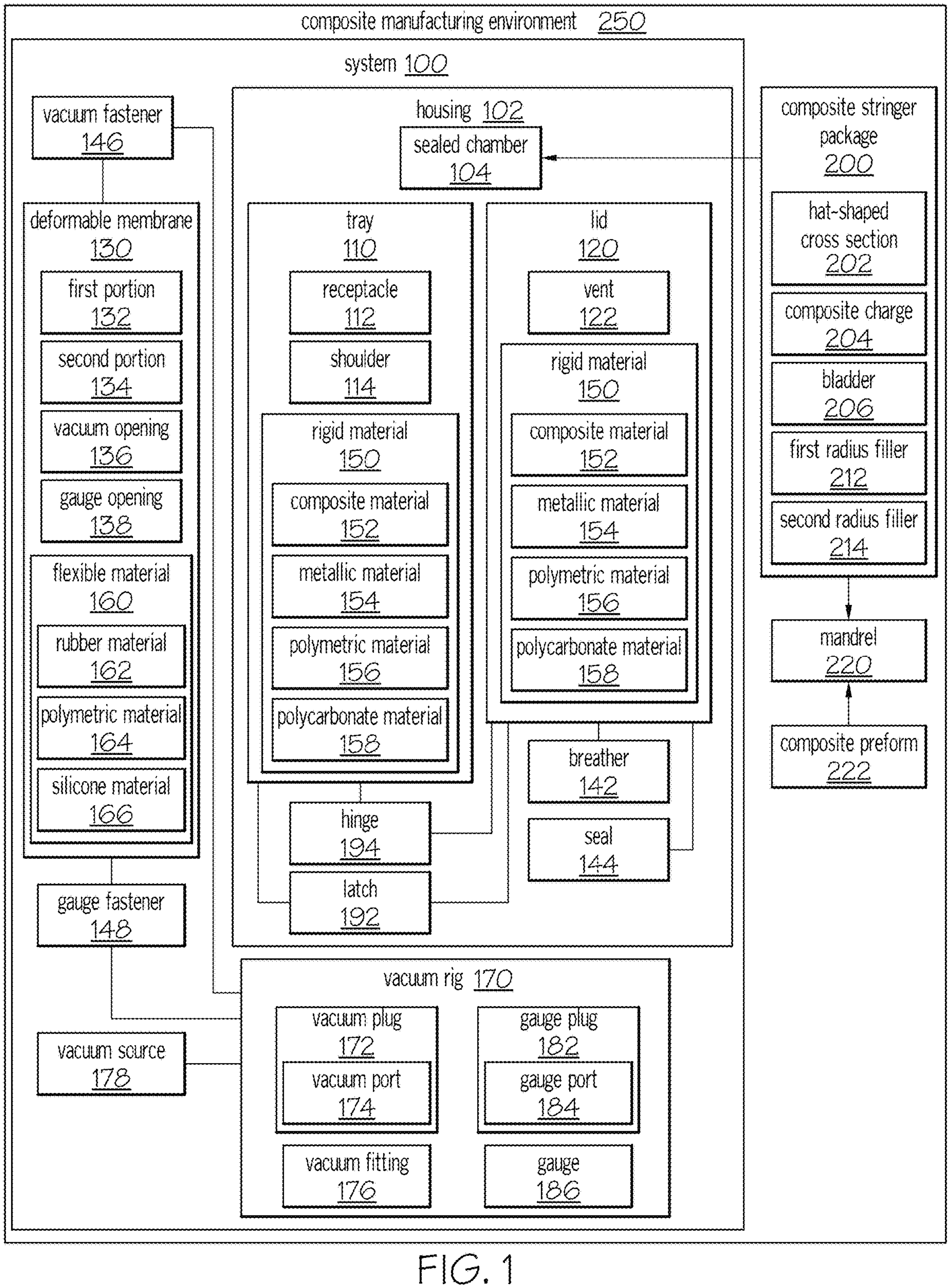
FIG. 1 is a schematic block diagram of an example of a composite manufacturing environment.

The present disclosure recognizes that the components of a hat-shaped composite stringer for an aircraft, including a bladder, one or more radius fillers, one or more composite charges that form an upper portion of a hat down to opposing flanges, and one or more composite charges that form a bottom section from flange-to-flange, are currently manually assembled on a mandrel, such as a curing mandrel associated with a barrel section or wing section of an aircraft. Ultimately, this requires that part (e.g., barrel or wing) layup and fabrication include the time needed to assemble the several components of each of the stringers. This process must then be repeated for each of the many stringers used for the part (e.g., around the barrel section).

The present disclosure also recognizes that part layup and fabrication require each of the stringer components to be assembled sequentially and manually. Often, such stringer construction can only be performed when the mandrel is accessible and/or ergonomically available to the worker. As such, it is common for the mandrel to be rotated relative to the worker based ergonomically convenient positions for each of the stringers, referred to as serial kitting. The constructed stringer then needs to be held in place until all of the remaining stringers are manually constructed or kitted on the mandrel. This serial process takes a considerable amount of time.

The systems and methods disclosed herein advantageously enable the components of a composite stringer to be brought together sooner in the manufacturing process than presently possible. The systems and methods disclosed herein advantageously enable construction, or "kitting," of stringers away from the mandrel and upstream of the current process. The systems and methods disclosed herein advantageously enable all stringers to be constructed or kitted in parallel, rather than the conventional serial kitting process. The systems and methods disclosed herein advantageously enable the stringer constructing or kitting process to occur away from the space limitations imposed by the mandrel. The systems and methods disclosed herein advantageously enable the constructed or kitted stringers to be consolidated, again in parallel, before being placed upon the mandrel. The systems and methods disclosed herein advantageously enable the stringer constructing or kitting process to be performed in multiple or different locations, such as away from the mandrel. The systems and methods disclosed herein advantageously enable the constructed or kitted stringer to be placed upon the mandrel, thus shortening the time the mandrel is occupied. The systems and methods disclosed herein advantageously enable the constructed or kitted stringers to be stored until time for placement on the mandrel.

As will be described in more detail herein, examples of the system and methods disclosed herein enable kitting of all components needed for a composite stringer package in a composite manufacturing environment 250, including a bladder, plies of composite material, and radius fillers. Examples of the system and methods disclosed herein enable a composite stringer package to be consolidated or compacted to form the consolidated composite stringer package. Examples of the system and methods enable the consolidated composite stringer package to be stored and transported. Examples of the system and methods enable single installation of an entirety of a consolidated composite stringer package onto a cure tool.

It can be appreciated that the components of the system 100 and the composite stringer package 200 are schematically illustrated by examples in FIGS. 4-15. As such, the different components of the system 100 and/or the composite stringer package 200 may be illustrated in a spaced-apart manner for the purpose of clarity.

Referring now to FIGS. 1 and 4-15, by way of examples, the present disclosure is directed to a system 100 for constructing a composite stringer package 200, also referred to as a stringer kitting system. The following are examples of the system 100, according to the present disclosure. Examples of the system 100 include a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

Figure 4:
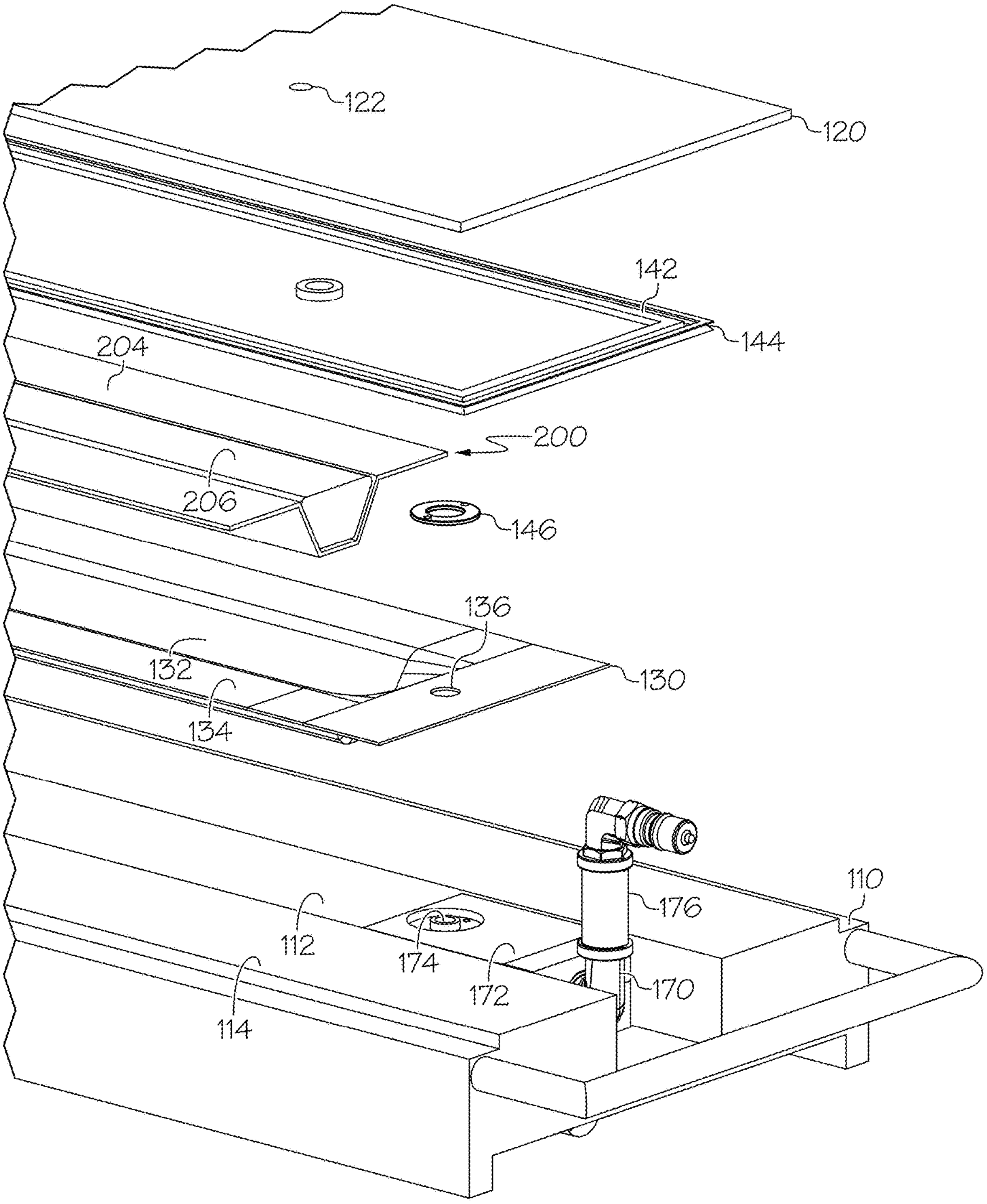
FIG. 4 is a schematic, exploded, perspective view of an example of a portion of a system for constructing and storing a composite stringer package.

As illustrated in FIGS. 1, 4-7, 14 and 15, in one or more examples, the system 100 includes a tray 110. The tray 110 is configured for receiving and/or supporting at least a portion of the composite stringer package 200. The tray 110 is configured for housing and storing the composite stringer package 200 as needed during a composite manufacturing operation. [0029] The tray 110 forms a base structure that supports the components of the composite stringer package 200 during arrangement of the components and construction of the composite stringer package 200 (e.g., as shown in FIG. 4).

As illustrated in FIGS. 1, 4-6, 14 and 15, in one or more examples, the tray 110 includes a receptacle 112. The receptacle 112 is configured for receiving components of the composite stringer package 200 during construction or layup. Generally, the tray 110 includes a support surface upon which the components of the composite stringer package 200 are placed and supported during construction. The support surface of the tray 110 has a geometry suitable for the desired geometry and/or shape of the stringer being constructed using the system 100. In one or more examples, the stringer is intended to have a hat-shaped cross-section 202. As such, the tray 110 is configured to support the composite stringer package 200 such that the composite stringer package 200 has the hat-shaped cross-section 202. In one or more examples, The tray 110 includes raised edges forming a shoulder 114 that surrounds or defines a perimeter of the receptacle 112. In these examples, the support surface of the tray 110 is formed by a floor and walls of the receptacle 112 and the shoulders 114. In one or more examples, the support surface has a geometry that supports the hat-shaped cross-section 202 of the composite stringer package 200 being constructed using the system 100.

As illustrated in FIG. 4, generally, a composite stringer having the hat-shaped cross-section 202 includes a cap, a first web that extends from the cap, a first flange that extends from the first web opposite the cap, a second web that extends from the cap opposite the first web, and a second flange that extends from the second web opposite the cap.

As illustrated in FIGS. 1, 4-7, 14 and 15, in one or more examples, the system 100 includes a lid 120. The lid 120 is configured for enclosing the composite stringer package 200 between the tray 110 and the lid 120. In one or mor examples, the lid 120 is configured for moving relative to the tray 110 between an open state and a closed state. In the closed state, the lid 120 closes the receptacle 112 and encloses the composite stringer package 200 between the tray 110 and the lid 120. The lid 120 enables closure of the housing 102 such that the tray 110 and the lid 120 form a sealed interior chamber (e.g., sealed chamber 104) that holds the composite stringer package 200 and that can be pressurized by application of vacuum to compact the composite stringer package 200. In one or more examples, the lid 120 also serves as a forming tool upon which the composite stringer package 200 is consolidated or compacted upon application of vacuum.

In one or more examples, the tray 110 and the lid 120, in combination, form a housing 102 of the system 100. In these examples, the housing 102 forms the sealed chamber 104, which receives and encloses the components of the composite stringer package 200 during construction and consolidation.

Figure 15:
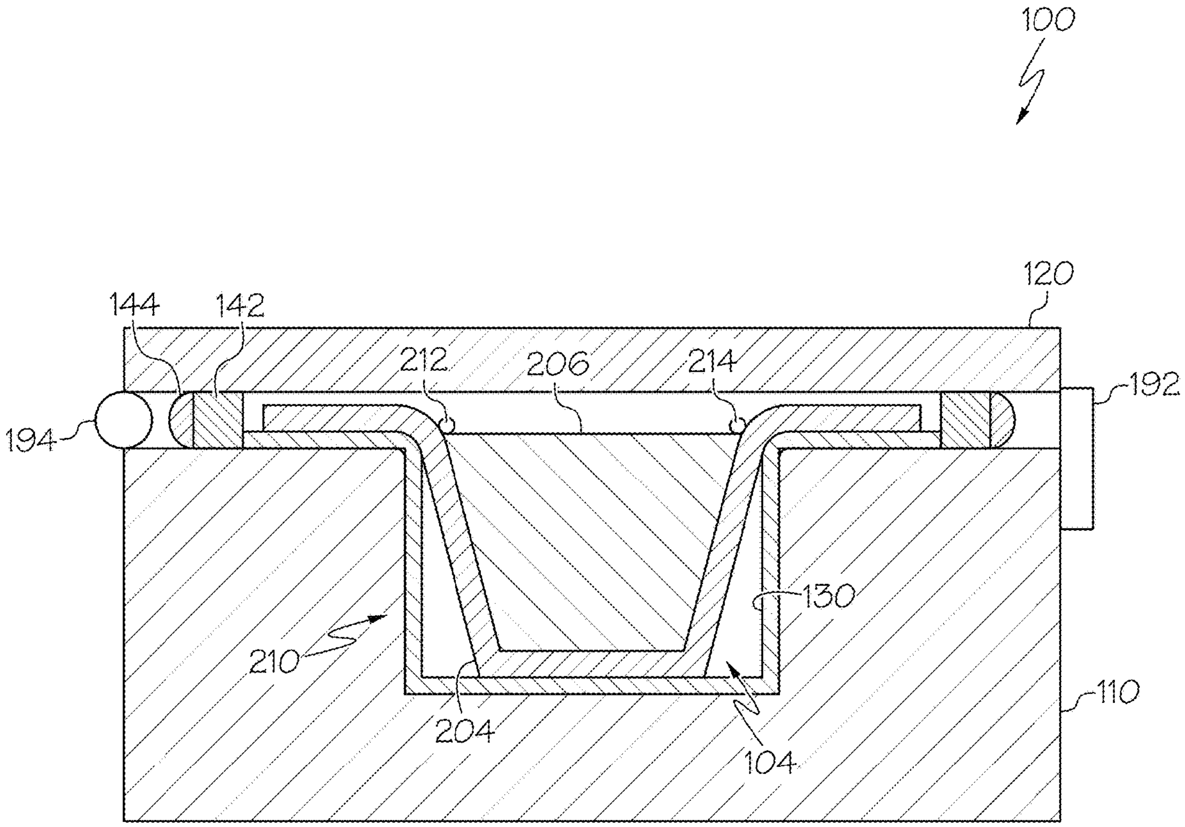
FIG. 15 is a schematic, sectional view of an example of the system and the composite stringer package.

As illustrated in FIGS. 1 and 15, one or mor examples, with the lid 120 in the closed state, the lid 120 and the tray 110 are sealed together to form a sealed chamber 104. The components of the composite stringer package 200 are positioned within the sealed chamber 104 for consolidation or compaction using the system 100. The sealed chamber 104 enables application of vacuum to the composite stringer package 200 positioned within the sealed chamber 104.

For the purpose of the present disclosure, and unless otherwise explicitly stated, items being sealed together and other uses of the term "sealed" refer to the items being airtight, thus preventing any gas from entering or leaving. As an example, reference to "seal," "sealed," and like terms refer to a hermetic seal or closure.

As illustrated in FIGS. 1, 5-7, 14 and 15, in one or more examples, the lid 120 is coupled to the tray 110. In one or more examples, the system 100 includes a hinge 194. The hinge 194 is coupled to the tray 110 and the lid 120. The hinge 194 is configured for enabling the lid 120 to rotate relative to the tray 110 between the open state and the closed state.

As illustrated in FIGS. 1, 7, 14 and 15, in one or more examples, the system 100 includes a latch 192. The latch 192 is configured for securing the lid 120 in the closed state relative to the tray 110. As an example, the latch 192 secures or locks the lid 120 to the tray 110 in the closed state. In these examples, the latch 192 is also releasable to enable the lid 120 to move relative to the tray 110.

As illustrated in FIGS. 1, 4-6, 14 and 15, in one or more examples, the system 100 includes a deformable membrane 130. The deformable membrane 130 is configured for compacting the composite stringer package 200 upon application of vacuum. In one or more examples, the deformable membrane 130 is configured for positioning over the tray 110. In one or more examples, a portion of the deformable membrane 130 is configured to be received by the receptacle 112 of the tray 110. In one or more examples, the deformable membrane 130 lines the tray 110, such as at least the receptacle 112 of the tray 110. In one or mor examples, with the lid 120 in the closed state, the deformable membrane 130 is positioned in the sealed chamber 104 between the tray 110 and the lid 120. In one or more examples, with the housing 102 in the closed state and during application of vacuum within the sealed chamber 104, the deformable membrane 130 is drawn toward a forming surface (e.g., interior surface) of the lid 120. In response to the vacuum, the deformable membrane 130 applies a consolidation or compaction force upon the composite stringer package 200.

As illustrated in FIGS. 4-6, 14 and 15, in one or more examples, with deformable membrane 130 positioned over the tray 110, a first portion 132 of the deformable membrane 130 is received in the receptacle 112. In one or more examples, the tray 110 includes the shoulder 114. The shoulder 114 surrounds the receptacle 112. In one or more examples, with deformable membrane 130 positioned over the tray 110, a second portion 134 of the deformable membrane 130 is positioned on the shoulder 114.

As illustrated in FIG. 15, in one or more examples, with the lid 120 in the closed state, the lid 120 is sealed to the shoulder 114 of the tray 110 around the second portion 134 of the deformable membrane 130. In one or more examples, with the lid 120 in the closed state, the second portion 134 of the deformable membrane 130 is clamped between the shoulder 114 and the lid 120.

As illustrated in FIGS. 1, 4-6, 14 and 15, in one or more examples, the system 100 includes a vacuum rig 170. The vacuum rig 170 is configured for applying vacuum (e.g., negative pressure) to the composite stringer package 200 enclosed by the tray 110 and the lid 120. In one or more examples, the vacuum rig 170 is coupled to the tray 110. In one or mor examples, with the lid 120 in the closed state, the vacuum rig 170 is configured for applying vacuum to the sealed chamber 104.

As illustrated in FIGS. 1, 4-6, 8, 9, 14 and 15, in one or more examples, the system 100 includes a breather 142. With the lid 120 in the closed state, the breather 142 is situated between the lid 120 and the tray 110. With the lid 120 in the closed state, the breather 142 is configured for distributing vacuum to the sealed chamber 104. In one or more examples, the breather 142 is coupled to the lid 120. With the lid 120 in the closed state, the breather 142 is in contact with an interior surface of the lid 120 and the shoulder 114 of the tray 110.

Figure 8:
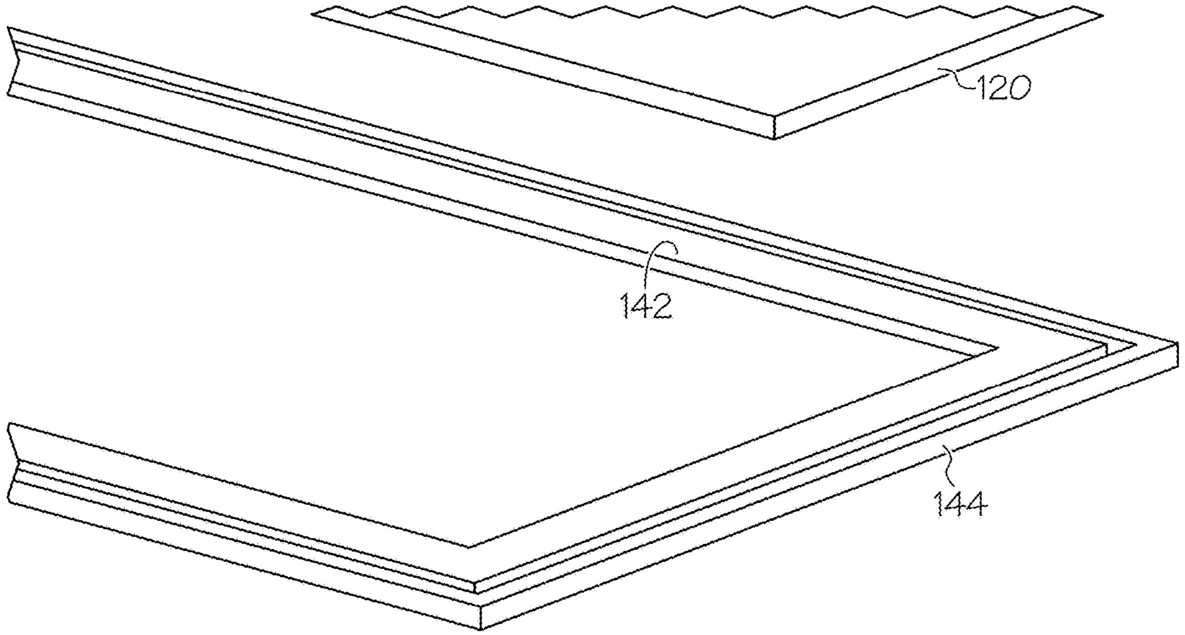
FIG. 8 is schematic, perspective view of an example of a portion of a breather and a seal of the system.
Figure 9:
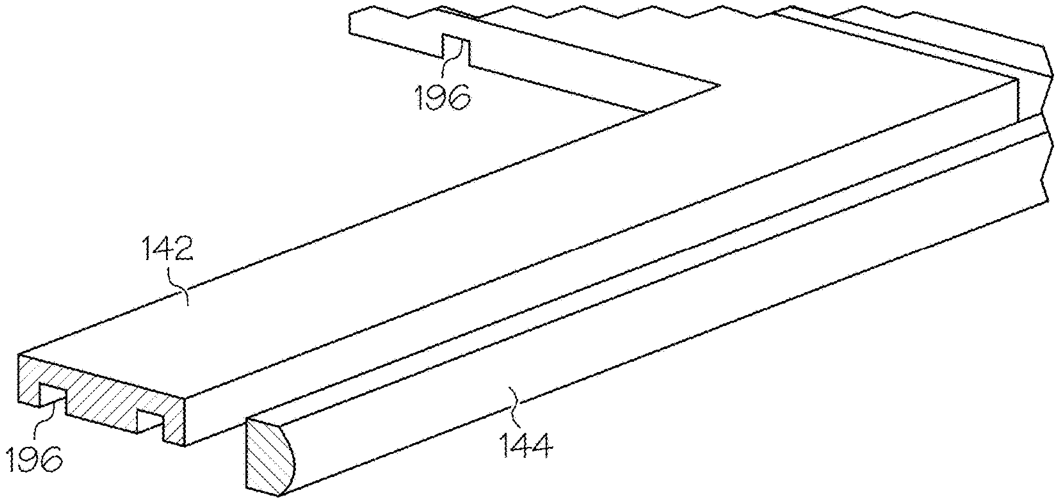
FIG. 9 is a schematic, perspective, sectional view of an example of a portion of the breather and the seal of the system.
Figure 10:
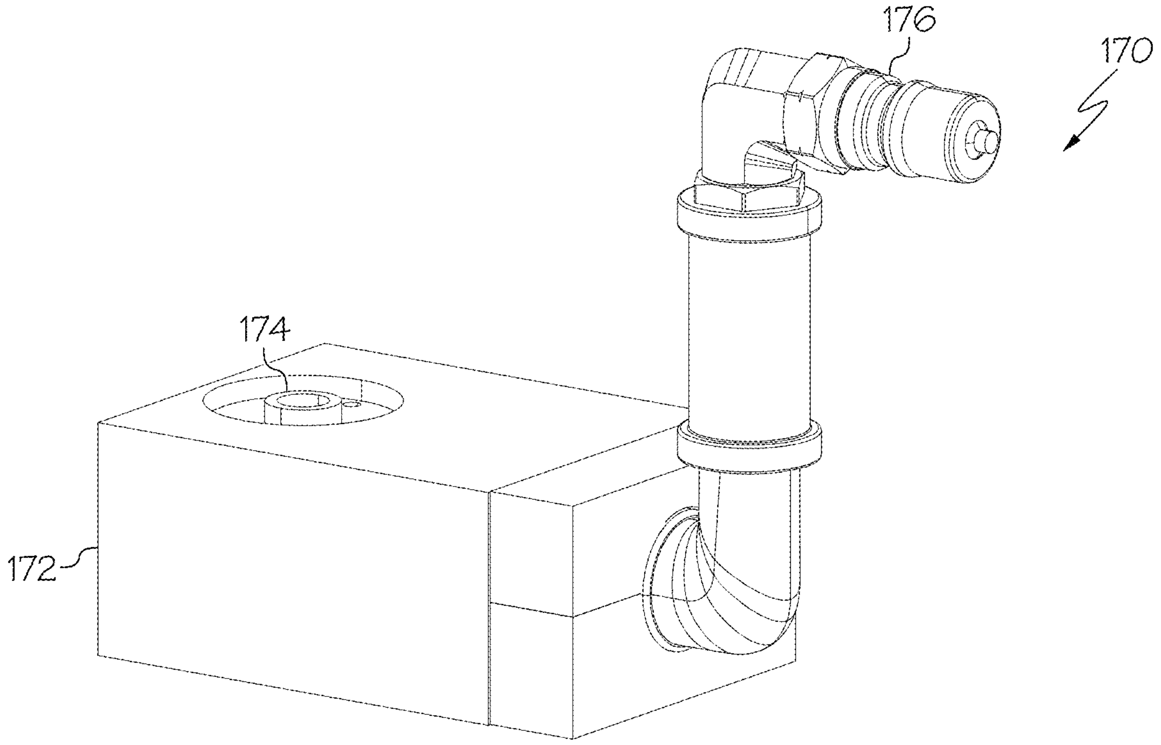
FIG. 10 is a schematic, perspective view of an example of a vacuum rig of the system.
Figure 11:
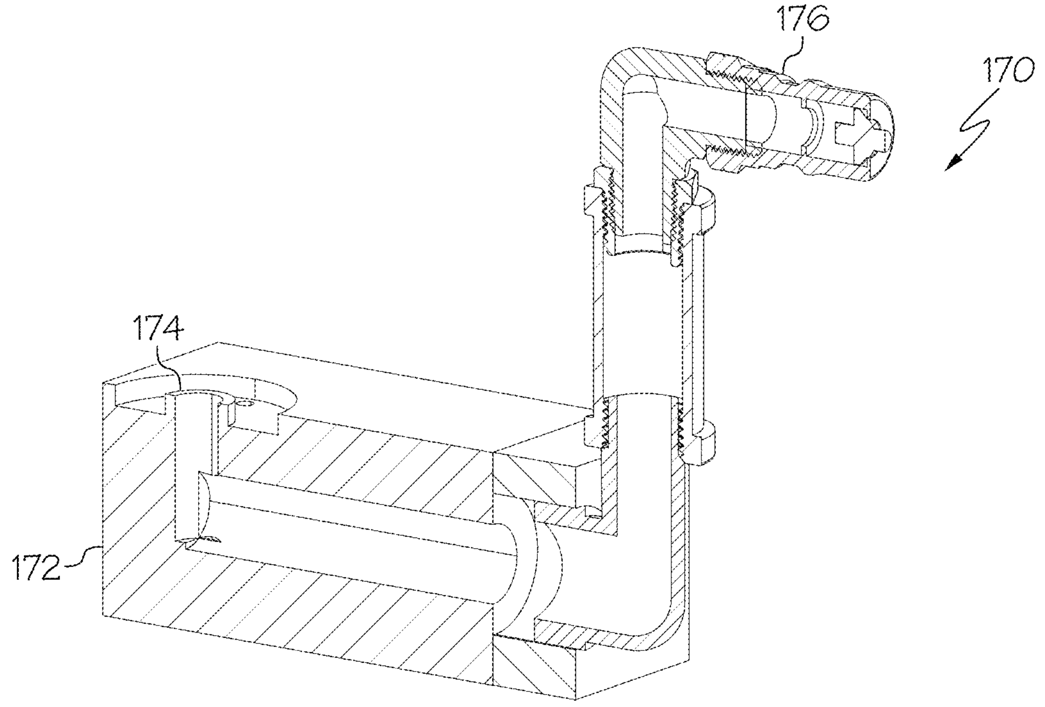
FIG. 11 is a schematic, perspective, sectional view of the example of the vacuum rig shown in FIG. 10.
Figure 12:
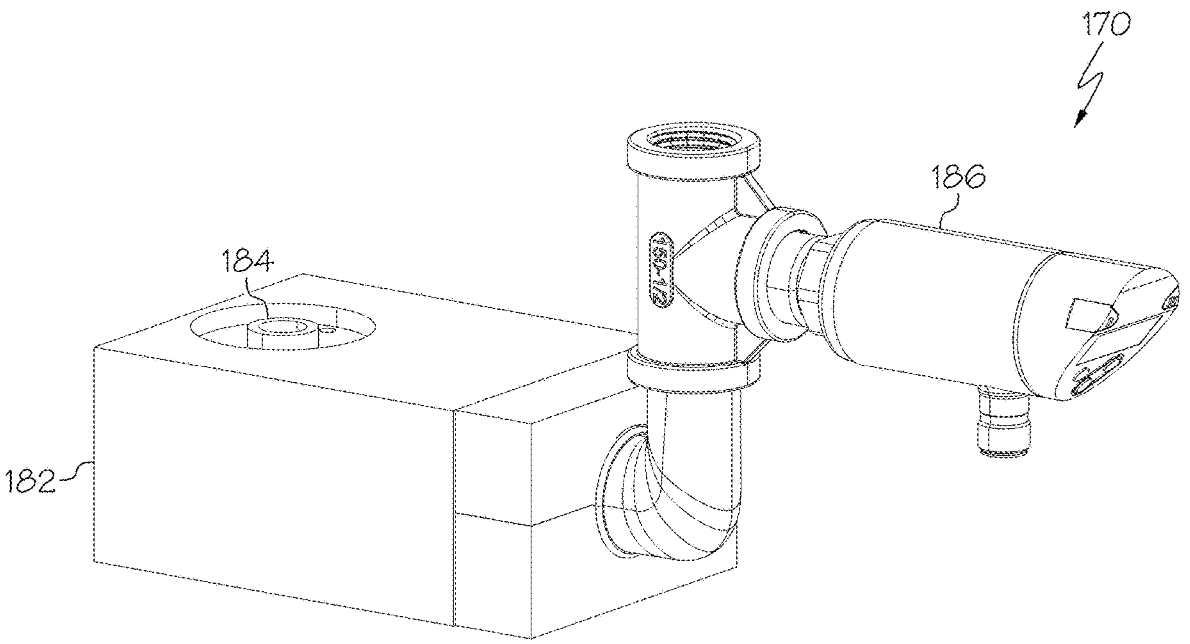
FIG. 12 is a schematic, perspective view of an example of a vacuum rig of the system.
Figure 13:
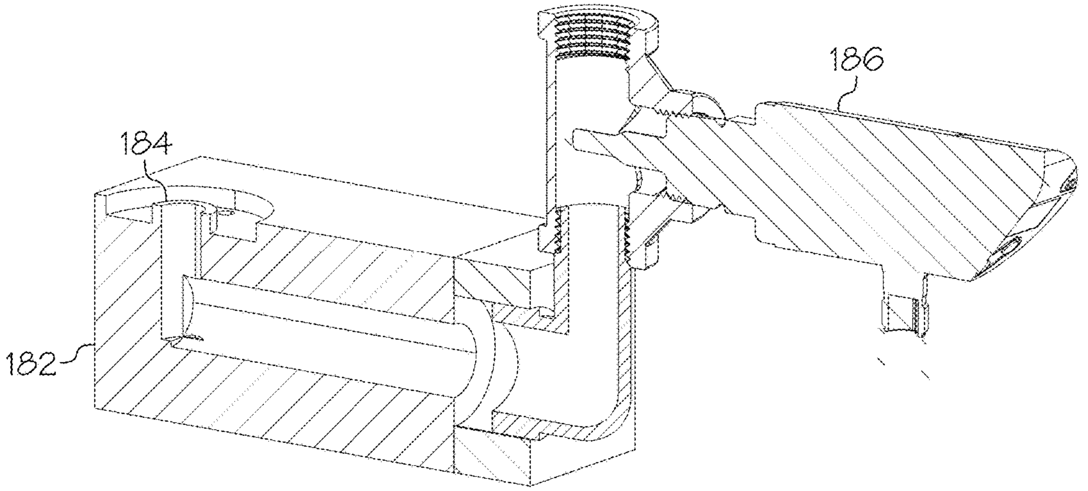
FIG. 13 is a schematic, perspective, sectional view of the example of the vacuum rig shown in FIG. 12.
Figure 14:
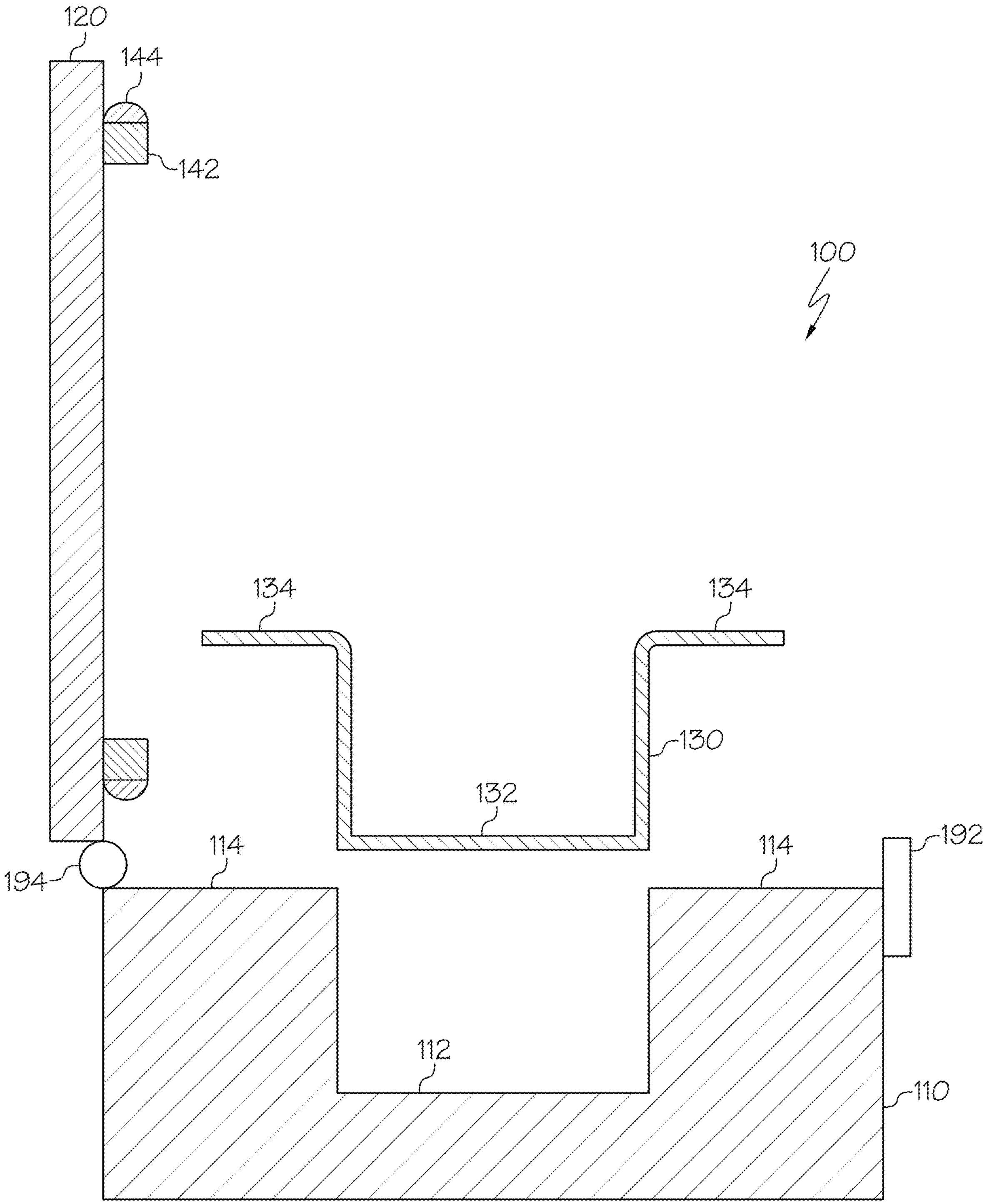
FIG. 14 is a schematic, sectional view of an example of the system.

As illustrated in FIGS. 8 and 9, in one or more examples, the breather 142 includes or takes the form of a strip of material configured for allowing gas to move from the sealed chamber 104 and helps distributed vacuum pressure evenly to the sealed chamber 104 and across the composite stringer package 200. In one or more examples, the breather 142 includes an arrangement of channels 196 that intersect each other. At least one of the channels 196 terminates at an opening located on an interior perimeter of the breather 142 and is in fluid communication with the sealed chamber 104 with the lid 120 in the closed state.

As illustrated in FIGS. 1, 4-6, 8, 9, 14 and 15, in one or more examples, the system 100 includes a seal 144. With the lid 120 in the closed state, the seal 144 seals the lid 120 to the tray 110. With the lid 120 in the closed state, the seal 144 is in contact with an interior surface of the lid 120 and the shoulder 114 of the tray 110. In one or more examples, the seal 144 is situated or arranged around the breather 142. In one or more examples, the seal 144 is coupled to the lid 120 around and/or proximate to a perimeter of the breather 142. The seal 144 can have any suitable cross-sectional shape, such as circular, semi-circular, square, rectangular, L-shaped, and the like.

As illustrated in FIGS. 1, 4-7, in one or more examples, the lid 120 includes a vent 122. With the lid 120 in the closed state, the vent 122 is configured for fluid communication with the receptacle 112. With the lid 120 in the closed state and the composite stringer package 200 positioned in the sealed chamber 104, the vent 122 is configured for fluid communication with a bladder 206 of the composite stringer package 200. The vent 122 enables the bladder 206 to remain pressurized at atmospheric pressure during application of vacuum to the sealed chamber 104.

As illustrated in FIGS. 1, 4, 5, 7, 10 and 11, in one or more examples, the vacuum rig 170 includes a vacuum plug 172 and a vacuum fitting 176. The vacuum plug 172 is positioned in the receptacle 112. The vacuum plug 172 includes a vacuum port 174. The vacuum fitting 176 is coupled to the vacuum plug 172. The vacuum fitting 176 is in fluid communication with the vacuum port 174. With the lid 120 in the closed state and sealed to the tray 110, the vacuum port 174 is in fluid communication with the sealed chamber 104. The vacuum plug 172 and vacuum fitting 176 enable removal of gas from the sealed chamber 104 and, thus, application of vacuum to the composite stringer package 200 positioned in the sealed chamber 104.

Figure 5:
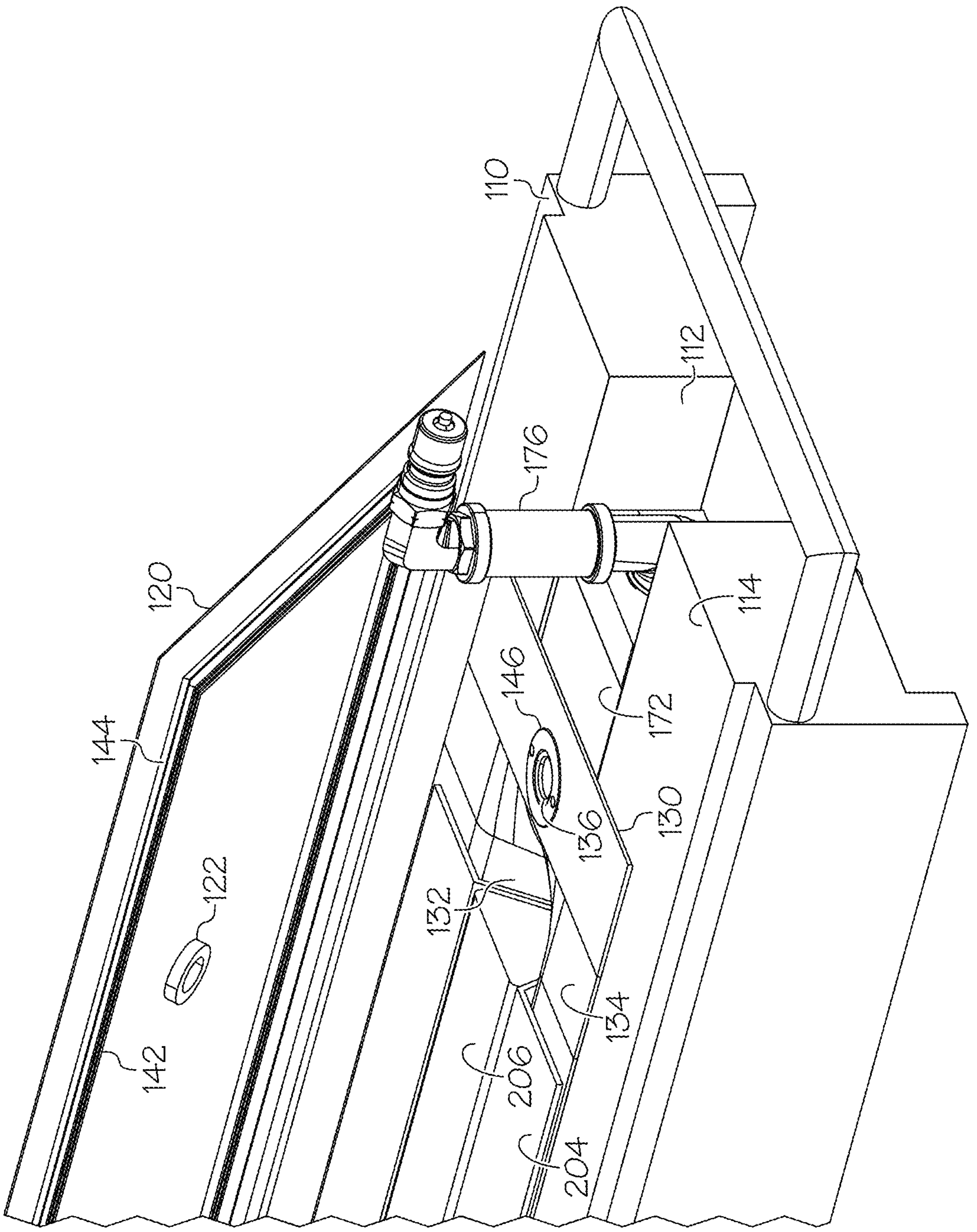
FIG. 5 is a schematic, perspective view of an example of a portion of the system.

As illustrated in FIGS. 1, 4 and 5, in one or more examples, the deformable membrane 130 includes a vacuum opening 136. With the deformable membrane 130 received in the receptacle 112, the vacuum opening 136 is aligned with the vacuum port 174. The vacuum opening 136 enables fluid communication between the sealed chamber 104 and the vacuum fitting 176 and, thus, removal of gas from the sealed chamber 104 through the deformable membrane 130.

As illustrated in FIGS. 1, 4 and 5, one or more examples, the system 100 includes a vacuum fastener 146. The vacuum fastener 146 is configured for aligning the vacuum opening 136 with the vacuum port 174. The vacuum fastener 146 is also configured for coupling the deformable membrane 130 to the tray 110. In one or more examples, with a portion of the deformable membrane 130 positioned between the vacuum fastener 146 and the vacuum plug 172, the vacuum fastener 146 is received by the vacuum port 174 of the vacuum plug 172 and is locked or secured to the vacuum plug 172 within the vacuum port 174.

As illustrated in FIGS. 1, 6, 12 and 13, one or more examples, the vacuum rig 170 includes a gauge plug 182. The gauge plug 182 is positioned in the receptacle 112. In one or more examples, the gauge plug 182 is positioned along the receptacle 112 opposite the vacuum plug 172. In one or more examples, the gauge plug 182 includes a gauge port 184. In one or more examples, the vacuum rig 170 includes a gauge 186 coupled to the gauge plug 182. The gauge 186 is in fluid communication with the gauge port 184. The gauge 186 and the gauge plug 182 enable measurement and monitoring of the negative pressure (e.g., vacuum) in the sealed chamber 104 and applied to the composite stringer package 200 during consolidation or compaction of the components of the composite stringer package 200.

Figure 6:
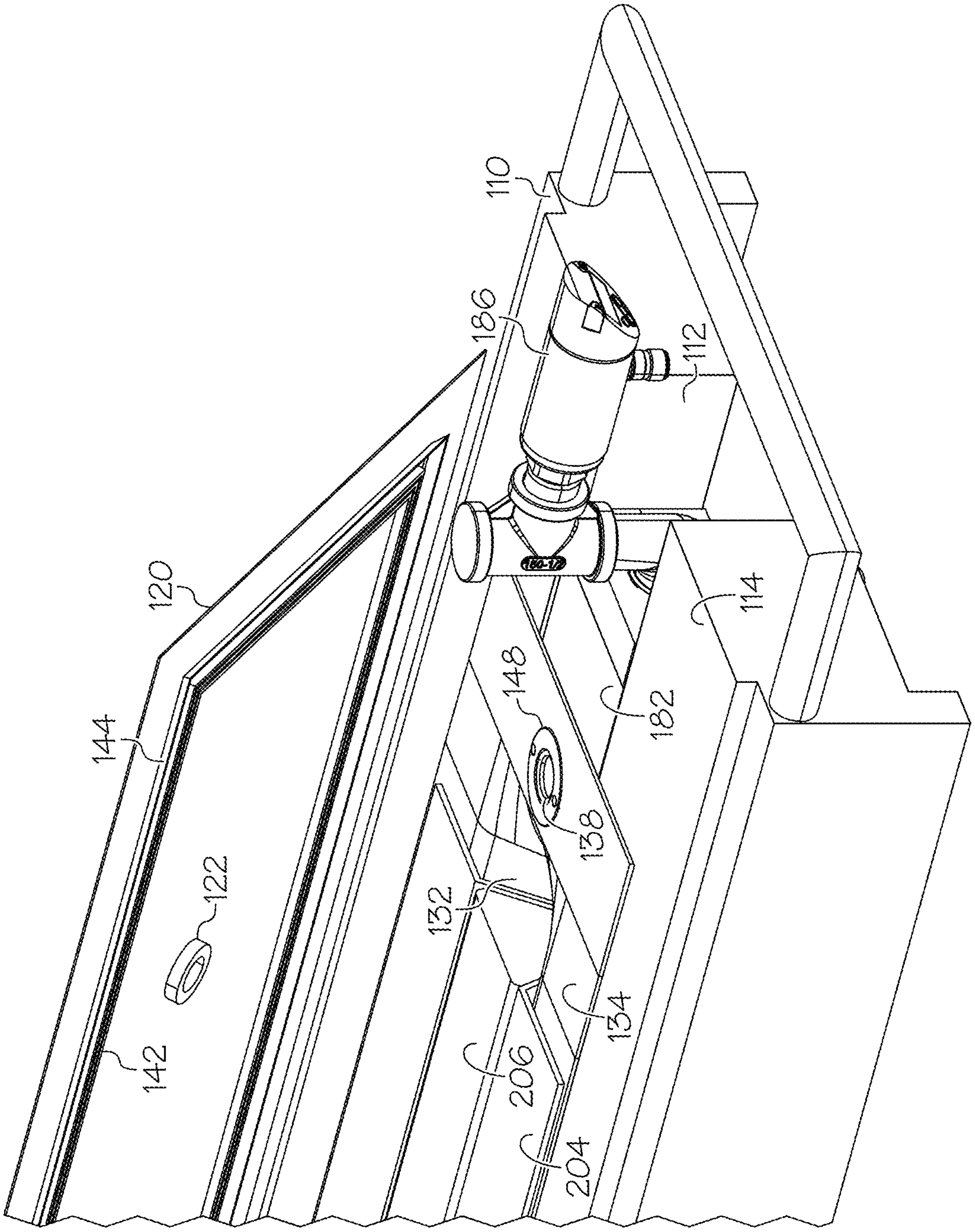
FIG. 6 is a schematic, perspective view of an example of a portion of the system.
Figure 7:
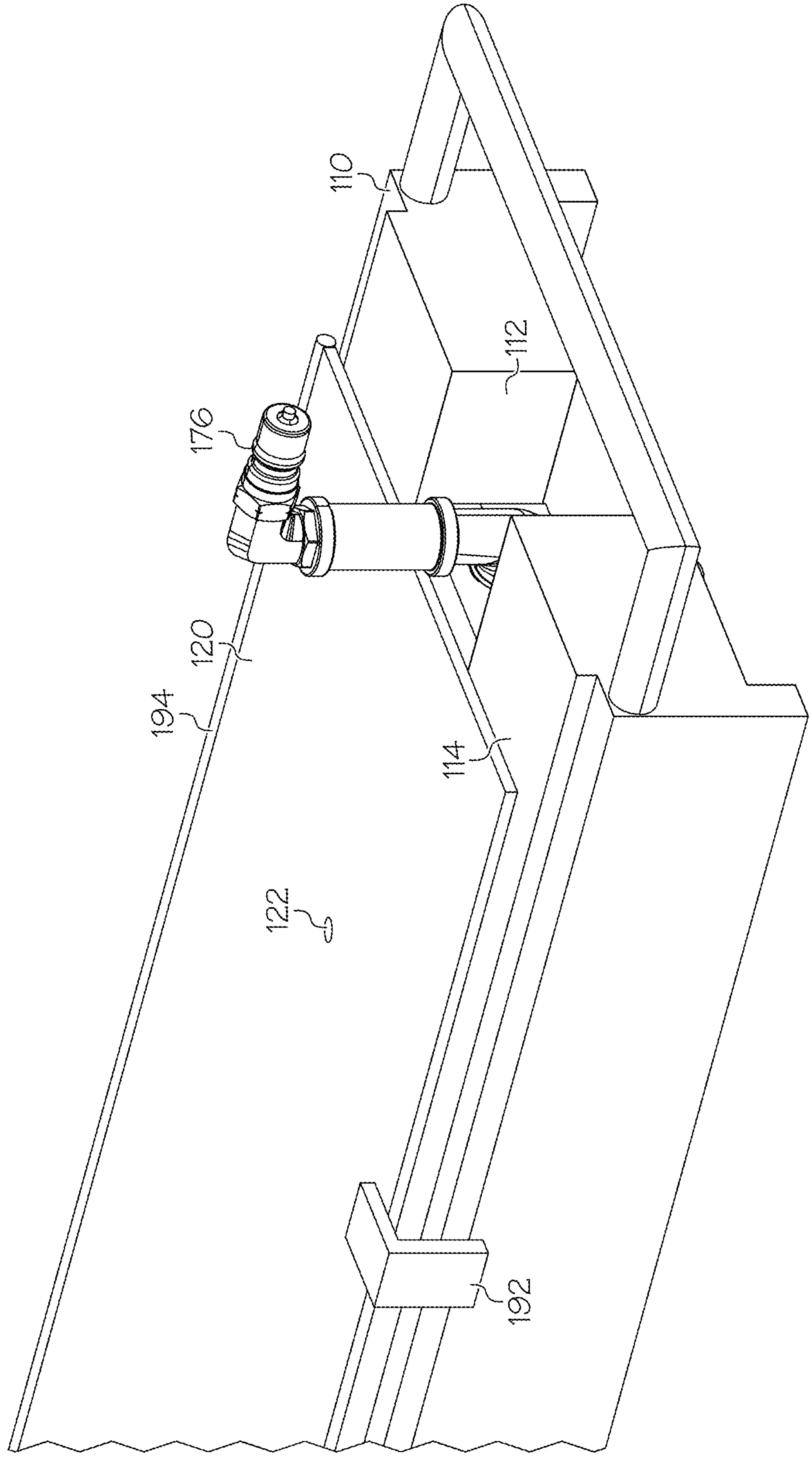
FIG. 7 is a schematic, perspective view of an example of a portion of the system.

As illustrated in FIGS. 1 and 6, in one or more examples, the deformable membrane 130 includes a gauge opening 138. With the deformable membrane 130 received in the receptacle 112, the gauge opening 138 is aligned with the gauge port 184. The gauge opening 138 enables fluid communication between the sealed chamber 104 and the gauge 186 through the deformable membrane 130.

As illustrated in FIGS. 1 and 6, in one or more examples, the system 100 includes a gauge fastener 148. The gauge fastener 148 is configured for aligning the gauge opening 138 with the gauge port 184. The gauge fastener 148 is also configured for coupling the deformable membrane 130 to the tray 110. In one or more examples, with a portion of the deformable membrane 130 positioned between the gauge fastener 148 and the gauge plug 182, the gauge fastener 148 is received by the gauge port 184 of the gauge plug 182 and is locked or secured to the gauge plug 182 within the gauge port 184.

In other examples (not explicitly illustrated), the system 100 (e.g., the vacuum rig 170) can include a second vacuum plug and a second vacuum fitting. The second vacuum plug is positioned in the receptacle 112, such as at an opposing end of the tray 110 as the vacuum plug 172. The second vacuum plug includes a second vacuum port. A second vacuum fitting is coupled to the second vacuum plug. The second vacuum fitting is in fluid communication with the second vacuum port. With the lid 120 in the closed state and sealed to the tray 110, the second vacuum port is in fluid communication with the sealed chamber 104. The second vacuum plug and second vacuum fitting enable removal of gas from the sealed chamber 104 from both ends of the tray 110 and, thus, application of vacuum to the composite stringer package 200 positioned in the sealed chamber 104. In these examples, the deformable membrane 130 includes a second vacuum opening. With the deformable membrane 130 received in the receptacle 112, the second vacuum opening is aligned with the second vacuum port. The second vacuum opening enables fluid communication between the sealed chamber 104 and the second vacuum fitting and, thus, removal of gas from the sealed chamber 104 through the deformable membrane 130. In these examples, a vacuum fastener 146 is configured for aligning the vacuum opening 136 with the vacuum port 174. The second vacuum fastener is also configured for coupling the deformable membrane 130 to the tray 110. In one or more examples, with a portion of the deformable membrane 130 positioned between the second vacuum fastener and the second vacuum plug, the second vacuum fastener is received by the second vacuum port of the vacuum plug second and is locked or secured to the second vacuum plug within the second vacuum port.

In one or more examples, the vacuum plug 172 is positioned in the receptacle 112 at one (e.g., first) end of the tray 110. The gauge plug 182 (or the second vacuum plug) is positioned in the receptacle 112 at the other (e.g., second) end of the tray 110, opposite the vacuum plug 172. In one or more examples, the vacuum plug 172 is positioned proximate to a first end of the composite stringer package 200 or a first end of the deformable membrane 130. The gauge plug 182 (or the second vacuum plug) is positioned proximate to a second end of the composite stringer package 200 or a second end of the deformable membrane 130.

As illustrated in FIG. 1, in one or more examples, the lid 120 is made of a rigid material 150. In one or more examples, the rigid material 150 of the lid 120 is made of a composite material. 152. In one or more examples, the rigid material 150 of the lid 120 is made of a metallic material 154. In one or more examples, the rigid material 150 of the lid 120 is made of a polymeric material 156. In one or more examples, the rigid material 150 of the lid 120 is made of a polycarbonate material 158.

As illustrated in FIG. 1, in one or more examples, the tray 110 is made of the rigid material 150. In one or more examples, the rigid material 150 of the tray 110 is made of the composite material 152. In one or more examples, the rigid material 150 of the tray 110 is made of the metallic material 154. In one or more examples, the rigid material 150 of the tray 110 is made of the polymeric material 156. In one or more examples, the rigid material 150 of the tray 110 is made of the polycarbonate material 158.

As illustrated in FIG. 1, in one or more examples, the deformable membrane 130 is made of a flexible material 160. In one or more examples, the rubber material 162 of the deformable membrane 130 is made of a rubber material 162. In one or more examples, the flexible material 160 of the deformable membrane 130 is made of a polymeric material 164. In one or more examples, the flexible material 160 of the deformable membrane 130 is made of a silicone material 166. In one or more examples, the deformable membrane 130 is made of a material that is suitable for contact with green composite materials of the components that form the composite stringer package 200. In one or more examples, the deformable membrane 130 includes or is formed of synthetic rubber sheet, a silicone rubber sheet, a fluoroelastomer (e.g., Viton™) rubber sheet, and the like, such as commercially available from Mosites Rubber Company, Inc. of Texas, USA.

Figure 2:
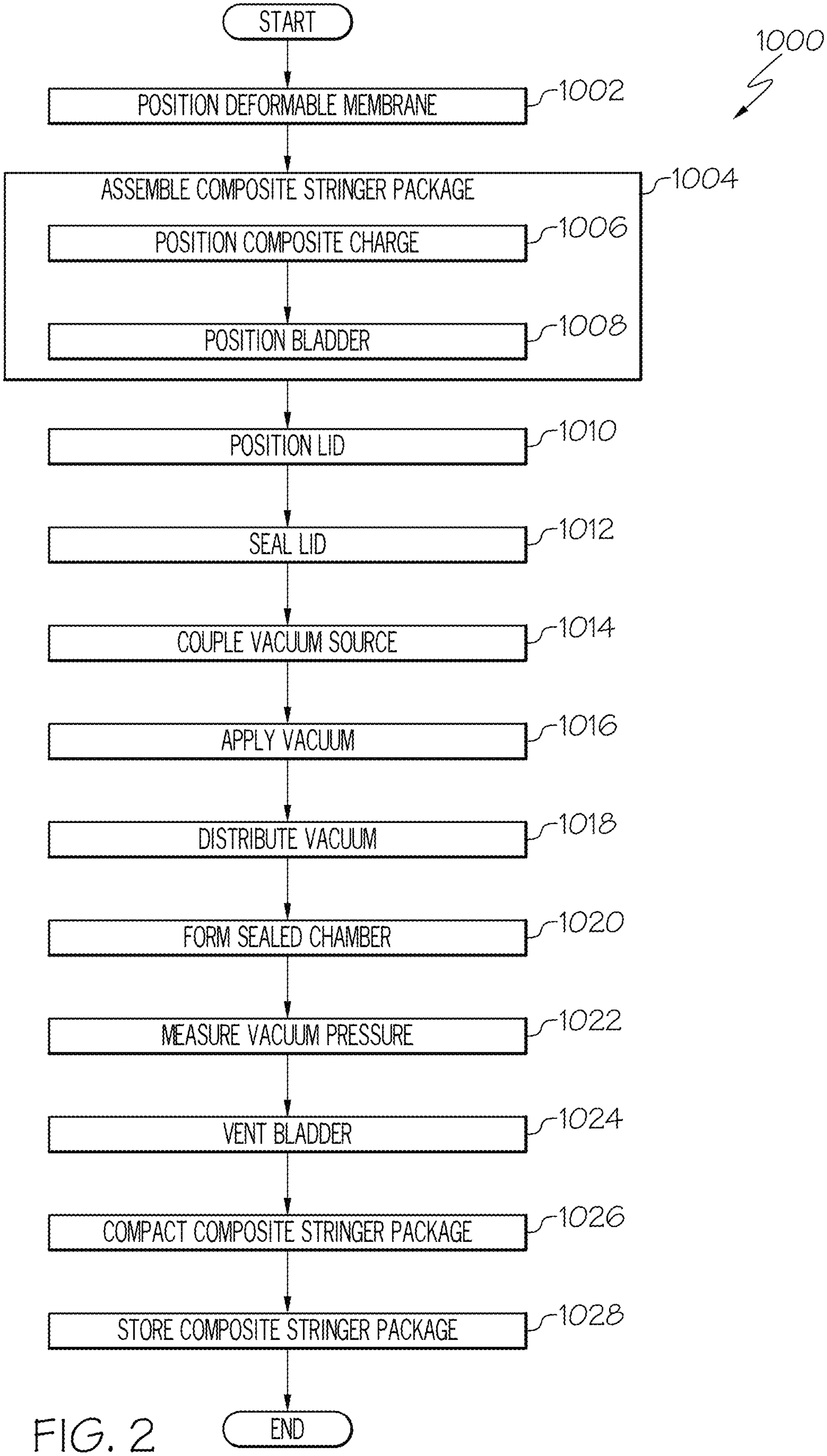
FIG. 2 is a flow diagram of an example of a method for constructing a composite stringer package.

Referring now to FIG. 2, by way of examples, present disclosure is also directed to a method 1000 for constructing the composite stringer package 200, also referred to herein as a stringer kitting method. The following are examples of the method 1000, according to the present disclosure. In one or more examples, the method 1000 is implemented using the system 100 (FIG. 1). Examples of the method 1000 include a number of elements, steps, operations, or processes. Not all of the elements, steps, operations, or processes described or illustrated in one example are required in that example. Some or all of the elements, steps, operations, or processes described or illustrated in one example can be combined with other examples in various ways without the need to include other elements, steps, operations, or processes described in those other examples, even though such combination or combinations are not explicitly described or illustrated by example herein.

In one or more examples, the method 1000 includes a step of positioning 1002 the deformable membrane 130 on the tray 110. In one or more examples, the deformable membrane 130 is positioned over the tray 110 such that the deformable membrane 130 lines the tray 110 and is positioned between the tray 110 and the components of the composite stringer package 200.

In one or more examples, the method 1000 includes a step of assembling 1004 the composite stringer package 200. The composite stringer package 200 includes a hat-shaped cross-section 202. In one or more examples, the step of assembling 1004 the composite stringer package 200 includes a step of positioning 1006 the composite charge 204 in the receptacle 112 of the tray 110 such that the deformable membrane 130 is situated between the tray 110 and the composite charge 204. In one or more examples, the step of assembling 1004 the composite stringer package 200 includes a step of positioning 1008 the bladder 206 in the receptacle 112 of the tray 110 such that the composite charge 204 is situated between the tray 110 and the bladder 206. In one or more examples, the step of assembling 1004 the composite stringer package 200 includes a step of positioning at least one radius filler (e.g., first radius filler 212 and/or second radius filler 214) in the receptacle 112 of the tray 110 along each side of the bladder 206.

In one or more examples, the composite charge 204 has the hat-shaped cross-section 202. In some examples, the bladder 206 is placed on or is disposed over the composite charge 204. In other examples, the composite charge 204 is placed (e.g., shaped or wrapped) around at least a portion of the bladder 206 to support further the hat-shaped cross-section 202. The first radius filler 212 is placed in contact with the composite charge 204 and the bladder 206. The second radius filler 214 is placed in contact with the composite charge 204 and the bladder 206. In one or more examples, the first radius filler 212 and/or the second radius filler 214 extend the length of the composite stringer package 200 and are spaced apart from and aligned with each other.

In one or more examples, the method 1000 includes a step of positioning 1010 the lid 120 in the closed state relative to the tray 110 to form the sealed chamber 104 and a step of sealing 1012 the lid 120 to the tray 110 in the closed state using the seal 144 that is situated between the lid 120 and the tray 110.

In one or more examples, the method 1000 includes a step of fluidly coupling 1014 a vacuum source 178 to the sealed chamber 104 using the vacuum rig 170. With the lid 120 in the closed state and the vacuum source 178 coupled to the vacuum rig 170, the method 1000 includes a step of applying 1016 vacuum to the sealed chamber 104. In one or more examples, the method 1000 includes a step of distributing 1018 the vacuum to the sealed chamber 104 using the breather 142 that is situated between the lid 120 and the tray 110.

In one or more examples, the method 1000 includes a step of forming 1020 the sealed chamber 104 with the lid 120 in the closed state and sealed to the tray 110. The composite stringer package 200 (e.g., assembled components of the composite stringer package 200) is enclosed within the sealed chamber 104.

In one or more examples, vacuum is applied to the chamber formed by the tray 110 and the lid 120 and is used to form the sealed chamber 104. In these examples, applying vacuum before or while forming the sealed chamber 104 enables the vacuum to provide a force that allows the seal 144 to "catch" and form an airtight chamber when the lid 120 is closed (e.g., moved to the closed state). In these examples, atmospheric pressure within the sealed chamber 104 is removed using the vacuum and then atmospheric pressure outside of the sealed chamber 104 provides compaction. As such, without vacuum, the inside and outside of the sealed chamber 104 would be in balance.

In one or more examples, the system 100 includes the vacuum source 178. The vacuum source 178 is coupled to the vacuum fitting 176. The vacuum source 178 generates vacuum and supplies vacuum to the housing 102 and within the sealed chamber 104. As an example, the vacuum source 178 includes a vacuum pump that is coupled to the vacuum fitting 176, such as via suitable vacuum lines. With the housing 102 in the closed state, the vacuum source 178 is selectively controlled to apply vacuum within the sealed chamber 104. In one or more examples, the method 1000 includes a step of measuring 1022 a vacuum pressure in the sealed chamber 104 using the vacuum rig 170.

In one or more examples, the method 1000 includes a step of venting 1024 the bladder 206 to atmosphere through the vent 122 in the lid 120. Venting the bladder 206 enables the bladder 206 to remain pressurized during compaction of the composite stringer package 200.

In one or more examples, the method 1000 includes a step of compacting 1026 the composite stringer package 200 between the deformable membrane 130 and the lid 120. The step of compacting 1026 is achieved by or is in response to the application of the vacuum.

In one or more examples, the method 1000 includes a step of storing 1028 the composite stringer package 200 in the sealed chamber 104. In these examples, the composite stringer package 200 is stored in the sealed chamber 104 formed by the tray 110 and the lid 120 and with vacuum applied to the sealed chamber 104. In this manner, the composite stringer package 200 can be constructed, consolidated, and held ready for application during a larger composite manufacturing operation (e.g., as illustrated by method 2000).

Figure 3:
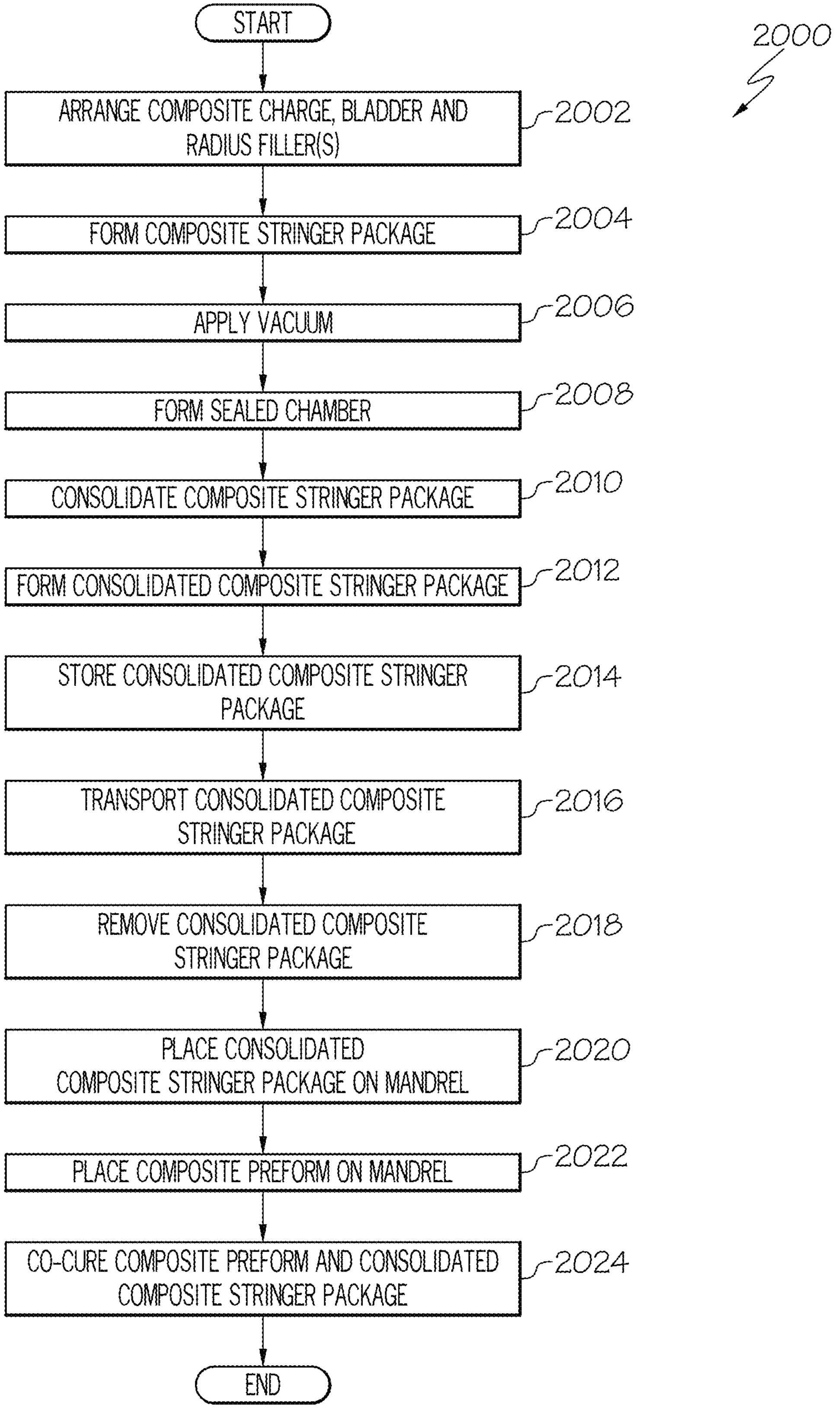
FIG. 3 is a flow diagram of an example of a composite manufacturing method.

Referring now to FIG. 3, by way of examples, the present disclosure is further directed to a method 2000 for composite manufacturing, also referred to herein as a composite manufacturing method. The following are examples of the method 2000, according to the present disclosure. In one or more examples, the method 2000 is implemented using the system 100 (FIG. 1). Examples of the method 1000 include a number of elements, steps, operations, or processes. Not all of the elements, steps, operations, or processes described or illustrated in one example are required in that example. Some or all of the elements, steps, operations, or processes described or illustrated in one example can be combined with other examples in various ways without the need to include other elements, steps, operations, or processes described in those other examples, even though such combination or combinations are not explicitly described or illustrated by example herein.

In one or more examples, the method 2000 includes a step of arranging 2002 the composite charge 204, the bladder 206, and, in some cases, at least one of the first radius filler 212 and/or second radius filler 214 as needed, in a housing 102. The method 2000 includes a step of forming 2004 the composite stringer package 200 by arranging the components. In these examples, the housing 102 includes or is formed by the tray 110 and the lid 120.

In one or more examples, the method 2000 includes a step of fluidly coupling the vacuum source 178 to the sealed chamber 104. In one or more examples, the vacuum source 178 is fluidly coupled to the sealed chamber 104 using the vacuum rig 170. The method 2000 includes a step of applying 2006 vacuum to the sealed chamber 104 to compact the composite stringer package 200. In one or more examples, vacuum is applied to the sealed chamber 104 using the vacuum rig 170. In one or more examples, the method 2000 includes a step of measuring the vacuum pressure in the sealed chamber 104. In one or more examples, vacuum pressure is measured using the vacuum rig 170. In one or more examples, the method includes a step of venting the bladder 206 of the composite stringer package 200 to atmosphere through the vent 122 in the lid 120. The bladder 206 is vented to atmosphere while applying vacuum.

In one or more examples, the method 2000 includes a step of forming 2008 the sealed chamber 104 in the housing 102 that encloses the composite stringer package 200. In these examples, the sealed chamber 104 is formed by moving the lid 120 in the closed state and sealing the lid 120 and the tray 110 together.

In one or more examples, vacuum is applied to the chamber formed by the tray 110 and the lid 120 and is used to form the sealed chamber 104. In these examples, applying vacuum before or while forming the sealed chamber 104 enables the vacuum to provide a force that allows the seal 144 to "catch" and form an airtight chamber when the lid 120 is closed (e.g., moved to the closed state).

In one or more examples, the method 2000 includes a step of consolidating 2010 or compacting the composite stringer package 200. In one or more examples, the components of the composite stringer package 200 are consolidated or otherwise compacted within the sealed chamber 104 and between the deformable membrane 130 and the lid 120. The step of consolidating 2010 is achieved by or is in response to the application of the vacuum. The method 2000 includes a step of forming 2012 a consolidated composite stringer package 210. The consolidated composite stringer package 210 is formed in response to consolidating the components of the composite stringer package 200 in the sealed chamber 104 by applying vacuum.

In one or more examples, the method 2000 includes a step of storing 2014 the consolidated composite stringer package 210 in the housing 102. In these examples, the consolidated composite stringer package 210 is stored in the sealed chamber 104 formed by the housing 102 (e.g., tray 110 and the lid 120) and with vacuum applied to the sealed chamber 104. In this manner, the composite stringer package 200 can be held ready for application during a follow-on composite manufacturing operation.

In one or more examples, the method 2000 includes a step of transporting 2016 the consolidated composite stringer package 210 within the housing 102 to a mandrel 220. The method 2000 includes a step of removing 2018 the consolidated composite stringer package 210 form the housing 102. The method 2000 includes a step of placing 2020 the consolidated composite stringer package 210 on the mandrel 220. The method 2000 includes a step of placing 2022 a composite preform 222 on the mandrel 220 over the consolidated composite stringer package 210. The method 2000 includes a step of co-curing 2024 the composite preform 222 and the consolidated composite stringer package 210 on the mandrel 220.

Referring now to FIGS. 1 and 4-7, 14 and 15, by way of examples, the present disclosure is additionally directed to the composite stringer package 200 and/or the consolidated composite stringer package 210 (FIG. 15). The following are examples of the composite stringer package 200, according to the present disclosure. Examples of the composite stringer package 200 include a number of elements, features, and components. In one or more examples, the composite stringer package 200 is constructed, consolidated, or otherwise fabricated using the system 100 (FIG. 1) and/or according to the method 1000 (FIG. 2). Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

In one or more examples, the composite stringer package 200 includes the composite charge 204. The composite charge 204 is positioned in the receptacle 112 of the tray 110 such that the deformable membrane 130 that lines the tray 110 is situated between the composite charge 204 and the tray 110. The composite stringer package 200 includes the bladder 206. The bladder 206 is positioned in the receptacle 112 such that the composite charge 204 is situated between the deformable membrane 130 and the bladder 206. In one or more examples of the composite stringer package 200, the composite charge 204 and the bladder 206 are enclosed within the sealed chamber 104 that is formed by the lid 120 and the tray 110. In one or more examples of the composite stringer package 200, the composite charge 204 and the bladder 206 are compacted between the deformable membrane 130 and the lid 120 by applying vacuum in the sealed chamber 104 through the deformable membrane 130.

Figure 16:
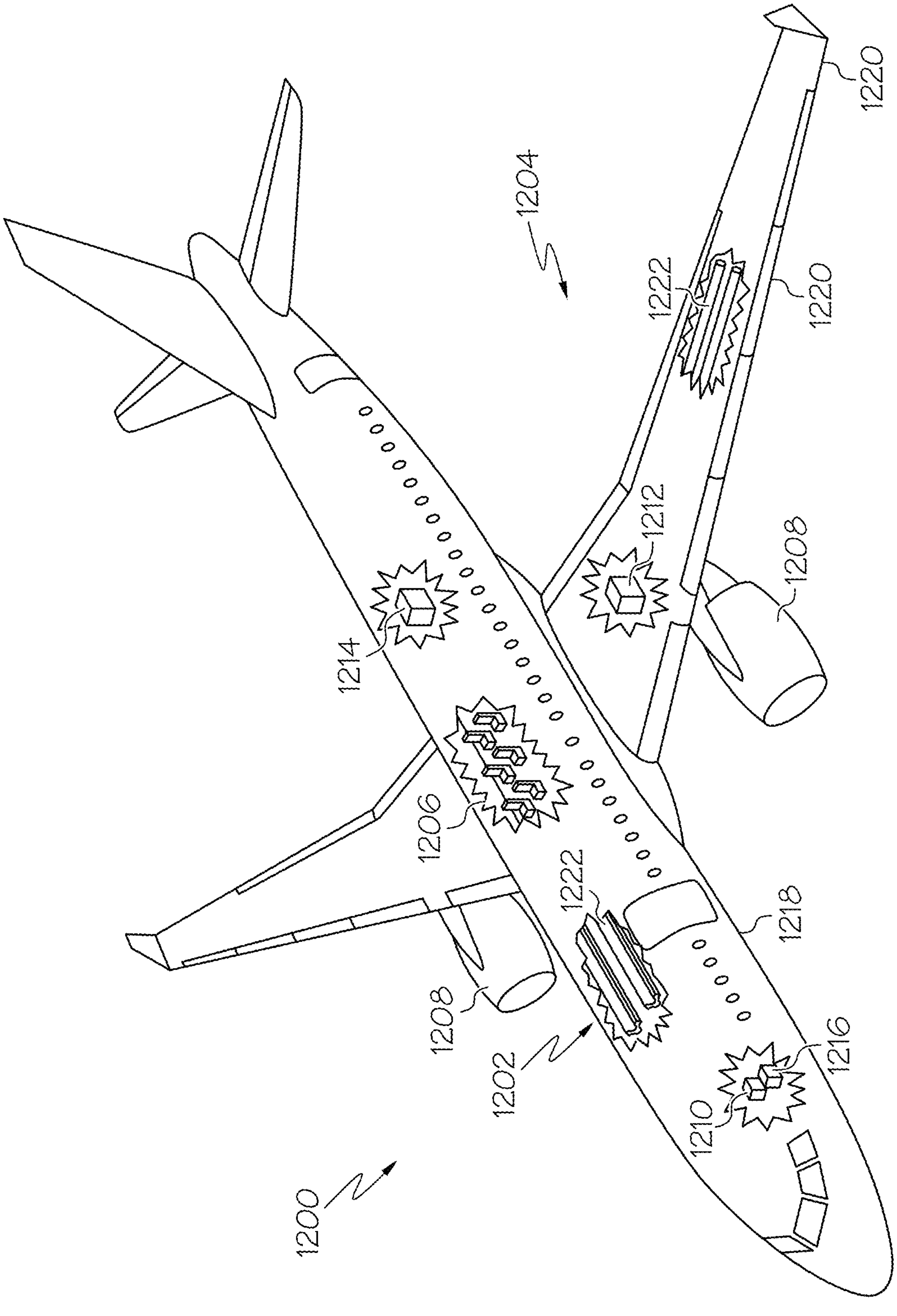
FIG. 16 is a schematic illustration of an example of an aircraft.
Figure 17:
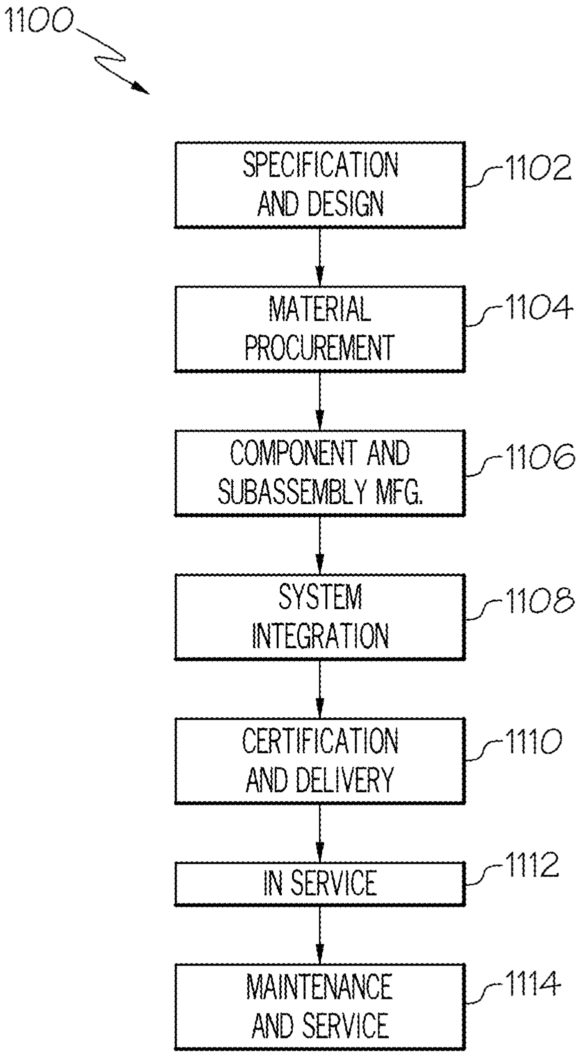
FIG. 17 is a flow diagram of an example of an aircraft manufacturing and service method.

Examples of the system 100, the method 1000, the method 2000, and the composite stringer package 200, described herein, may be related to, or used in the context of, an aircraft 1200 (FIG. 16) and an aerospace manufacturing and service method 1100 (FIG. 17). As an example, the aircraft 1200 and/or the manufacturing and service method 1100 may utilize consolidated composite stringer package 210 formed using the system 100 and/or according to the method 1000 and/or method 2000.

FIG. 15 illustrates an example of the aircraft 1200. The aircraft 1200 can be any aerospace vehicle or platform. In one or more examples, the aircraft 1200 includes the airframe 1202 having the interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to the airframe 1202 of the aircraft 1200. In yet other examples, the onboard systems 1204 also include one or more other systems 1216, such as, but not limited to, communications systems, avionics systems, software distribution systems, network communications systems, passenger information/entertainment systems, guidance systems, radar systems, weapons systems, and the like. The aircraft 1200 can have any number of composite components or structures that include composite stringers 1222 that are constructed and/or consolidated using the system 100 and/or according to the method 1000 and/or method 2000. As examples, a fuselage 1218 and/or wings 1220 of the aircraft 1200 can include the composite stringers 1222.

Referring to FIG. 17, during pre-production of the aircraft 1200, the manufacturing and service method 1100 includes specification and design 1102 of the aircraft 1200 and material procurement 1104. During production of the aircraft 1200, component and subassembly manufacturing 1106 and system integration 1108 of the aircraft 1200 take place. Thereafter, the aircraft 1200 goes through certification and delivery 1110 to be placed in service 1112. Routine maintenance and service 1114 includes modification, reconfiguration, refurbishment, etc. of one or more systems of the aircraft 1200.

Each of the processes of the manufacturing and service method 1100 illustrated in FIG. 17 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the system 100, the method 1000, the method 2000, and the composite stringer package 200, shown and described herein, may be employed during any one or more of the stages of the manufacturing and service method 1100 shown in the flow diagram illustrated by FIG. 17. In an example, composite stringers 1222 for the aircraft 1200 can be constructed and/or consolidated using the system 100 and/or according to the method 1000 during a portion of component and subassembly manufacturing 1106 and/or system integration 1108. Further, composite stringers 1222 for the aircraft 1200 can be constructed and/or consolidated using the system 100 and/or according to the method 1000 while the aircraft 1200 is in service 1112. Also, composite stringers 1222 for the aircraft 1200 can be constructed and/or consolidated using the system 100 and/or according to the method 1000 during system integration 1108 and certification and delivery 1110. Similarly, composite stringers 1222 for the aircraft 1200 can be constructed and/or consolidated using the system 100 and/or according to the method 1000 while the aircraft 1200 is in service 1112 and during maintenance and service 1114.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1 and 4-16, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1 and 4-16, referred to above, need be included in every example and not all elements, features, and/or components described herein are necessarily depicted in each illustrative example. Accordingly, some of the elements, features, and/or components described and illustrated in FIGS. 1 and 4-16 may be combined in various ways without the need to include other features described and illustrated in FIGS. 1 and 4-16, other drawing figures, and/or the accompanying disclosure, even though such combination or combinations are not explicitly illustrated herein. Similarly, additional features not limited to the examples presented, may be combined with some or all of the features shown and described herein.

Unless otherwise explicitly stated, the schematic illustrations of the examples depicted in FIGS. 1 and 4-16, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1 and 4-16, and such elements, features, and/or components may not be discussed in detail herein with reference to each of FIGS. 1 and 4-16. Similarly, all elements, features, and/or components may not be labeled in each of FIGS. 1 and 4-16, but reference numerals associated therewith may be utilized herein for consistency.

In FIGS. 2, 3 and 17, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 2, 3 and 17 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but does not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100, the method 1000, the method 2000, and the composite stringer package 200 have been shown and described, modifications may occur to those skilled in the art upon reading the specification. The present application includes such modifications and is limited only by the scope of the claims.

What is claimed is:

1. A system for constructing a composite stringer package, the system comprising:

a tray comprising a receptacle;

a lid configured for moving relative to the tray between an open state and a closed state;

a deformable membrane configured for positioning over the tray; and a vacuum rig coupled to the tray and comprising:

a vacuum plug positioned in the receptacle and comprising a vacuum port; and a vacuum fitting coupled to the vacuum plug and in fluid communication with the vacuum port, wherein, with the lid in the closed state:

the lid and the tray are sealed together to form a sealed chamber;

the deformable membrane is positioned in the sealed chamber between the tray and the lid;

the vacuum port is in fluid communication with the sealed chamber; and the vacuum rig is configured for applying vacuum to the sealed chamber.

2. The system of claim 1, wherein, with deformable membrane positioned over the tray, a first portion of the deformable membrane is received in the receptacle.

3. The system of claim 2, wherein:

the tray further comprises a shoulder that surrounds the receptacle; and with deformable membrane positioned over the tray, a second portion of the deformable membrane is positioned on the shoulder.

4. The system of claim 3, with the lid in the closed state, the lid is sealed to the shoulder of the tray around the second portion of the deformable membrane.

5. The system of claim 3, with the lid in the closed state, the second portion of the deformable membrane is clamped between the shoulder and the lid.

6. The system of claim 1, further comprising a breather coupled to the lid, wherein, with the lid in the closed state, the breather is situated between the lid and the tray and is configured for distributing vacuum to the sealed chamber.

7. The system of claim 6, further comprising a seal coupled to the lid around the breather, wherein with the lid in the closed state, the seal seals the lid to the tray.

8. The system of claim 1, wherein:

the lid comprises a vent; and with the lid in the closed state, the vent is configured for fluid communication with the receptacle.

9. The system of claim 1, wherein:

the deformable membrane comprises a vacuum opening; and with the deformable membrane received in the receptacle, the vacuum opening is aligned with the vacuum port.

10. The system of claim 9, further comprising a vacuum fastener configured for aligning the vacuum opening with the vacuum port and coupling the deformable membrane to the tray.

11. The system of claim 1, wherein the vacuum rig further comprises a gauge plug positioned in the receptacle opposite the vacuum plug.

12. The system of claim 11, wherein:

the gauge plug comprises a gauge port; and the vacuum rig further comprises a gauge coupled to the gauge plug and in fluid communication with the gauge port.

13. The system of claim 12, wherein:

the deformable membrane comprises a gauge opening; and with the deformable membrane received in the receptacle, the gauge opening is aligned with the gauge port.

14. The system of claim 13, further comprising a gauge fastener configured for aligning the gauge opening with the gauge port and coupling the deformable membrane to the tray.

15. The system of claim 1, further comprising a latch configured to secure the lid in the closed state relative to the tray.

16. The system of claim 1, further comprising a hinge coupled to the tray and the lid and configured for enabling the lid to rotate relative to the tray between the open state and the closed state.

17. The system of claim 1, wherein the lid is made of a rigid material.

18. A method for constructing a composite stringer package, the method comprising steps of:

positioning a deformable membrane on a tray;

assembling the composite stringer package that comprises a hat-shaped cross-section;

positioning a lid in a closed state relative to the tray to form a sealed chamber in which the deformable membrane is positioned in the sealed chamber between the tray and the lid;

with the lid in the closed state, applying vacuum to the sealed chamber via a vacuum rig coupled to the tray and comprising a vacuum plug positioned in the receptacle and a vacuum fitting in fluid communication with the vacuum plug; and compacting, by application of the vacuum, the composite stringer package between the deformable membrane and the lid.

19. A composite stringer package comprising:

a composite charge that is positioned in a receptacle of a tray such that a deformable membrane that lines the tray is situated between the composite charge and the tray;

a bladder that is positioned in the receptacle such that the composite charge is situated between the deformable membrane and the bladder, wherein:

the composite charge and the bladder are enclosed within a sealed chamber that is formed by a lid and the tray; and the composite charge and the bladder are compacted between the deformable membrane and the lid to form a consolidated composite stringer package by applying vacuum in the sealed chamber through the deformable membrane via a vacuum rig coupled to the tray and comprising a vacuum plug positioned in the receptacle and a vacuum fitting in fluid communication with the vacuum plug.

20. The method of claim 18, further comprising, with deformable membrane positioned over the tray, receiving a first portion of the deformable membrane in the receptacle and positioning a second portion of the deformable membrane on a shoulder of the tray surrounding the receptacle.

* * * * *